(12) United States Patent
Liu et al.

(10) Patent No.: US 9,360,689 B2
(45) Date of Patent: Jun. 7, 2016

(54) OPTICAL MODULATOR INCLUDING GRAPENE

(71) Applicants: Ming Liu, Riverside, CA (US); Xiaobo Yin, Boulder, CO (US); Xiang Zhang, Alamo, CA (US)

(72) Inventors: Ming Liu, Riverside, CA (US); Xiaobo Yin, Boulder, CO (US); Xiang Zhang, Alamo, CA (US)

(73) Assignee: The Regents of the University of California, Oakland, CA (US)

( * ) Notice: Subject to any disclaimer, the term of this patent is extended or adjusted under 35 U.S.C. 154(b) by 141 days.

(21) Appl. No.: 14/054,342

(22) Filed: Oct. 15, 2013

(65) Prior Publication Data
US 2014/0056551 A1    Feb. 27, 2014

Related U.S. Application Data

(63) Continuation-in-part of application No. PCT/US2012/034418, filed on Apr. 20, 2012.

(60) Provisional application No. 61/478,467, filed on Apr. 22, 2011, provisional application No. 61/598,471, filed on Feb. 14, 2012.

(51) Int. Cl.
*G02F 1/025* (2006.01)
*G02F 1/015* (2006.01)
*B82Y 20/00* (2011.01)

(52) U.S. Cl.
CPC ................ *G02F 1/025* (2013.01); *B82Y 20/00* (2013.01); *G02F 2001/0156* (2013.01); *G02F 2202/02* (2013.01)

(58) Field of Classification Search
CPC ............ G02F 1/025; G02F 2001/0156; G02F 2202/02; B82Y 20/00
USPC ............................................ 385/2–10, 14, 24
See application file for complete search history.

(56) References Cited

U.S. PATENT DOCUMENTS 8,554,022 B1 * 10/2013 Hochberg et al. ................. 385/1
2004/0213307 A1 * 10/2004 Lieber et al. ..................... 372/39
(Continued)

FOREIGN PATENT DOCUMENTS

CN    103439808 A    * 11/2013    .............. G02F 1/035

OTHER PUBLICATIONS

Ming Liu, Xiaobo Yin, and Xiang Zhang, Double-Layer Graphene Optical Modulator, Nano Letters 2012 12 (3), 1482-1485.
(Continued)

*Primary Examiner* — Akm Enayet Ullah
(74) *Attorney, Agent, or Firm* — Lawrence Berkeley National Laboratory

(57) ABSTRACT

The present invention provides for a one or more layer graphene optical modulator. In a first exemplary embodiment the optical modulator includes an optical waveguide, a nanoscale oxide spacer adjacent to a working region of the waveguide, and a monolayer graphene sheet adjacent to the spacer. In a second exemplary embodiment, the optical modulator includes at least one pair of active media, where the pair includes an oxide spacer, a first monolayer graphene sheet adjacent to a first side of the spacer, and a second monolayer graphene sheet adjacent to a second side of the spacer, and at least one optical waveguide adjacent to the pair.

20 Claims, 11 Drawing Sheets

(56) References Cited

U.S. PATENT DOCUMENTS

Figures 2A, 2B:
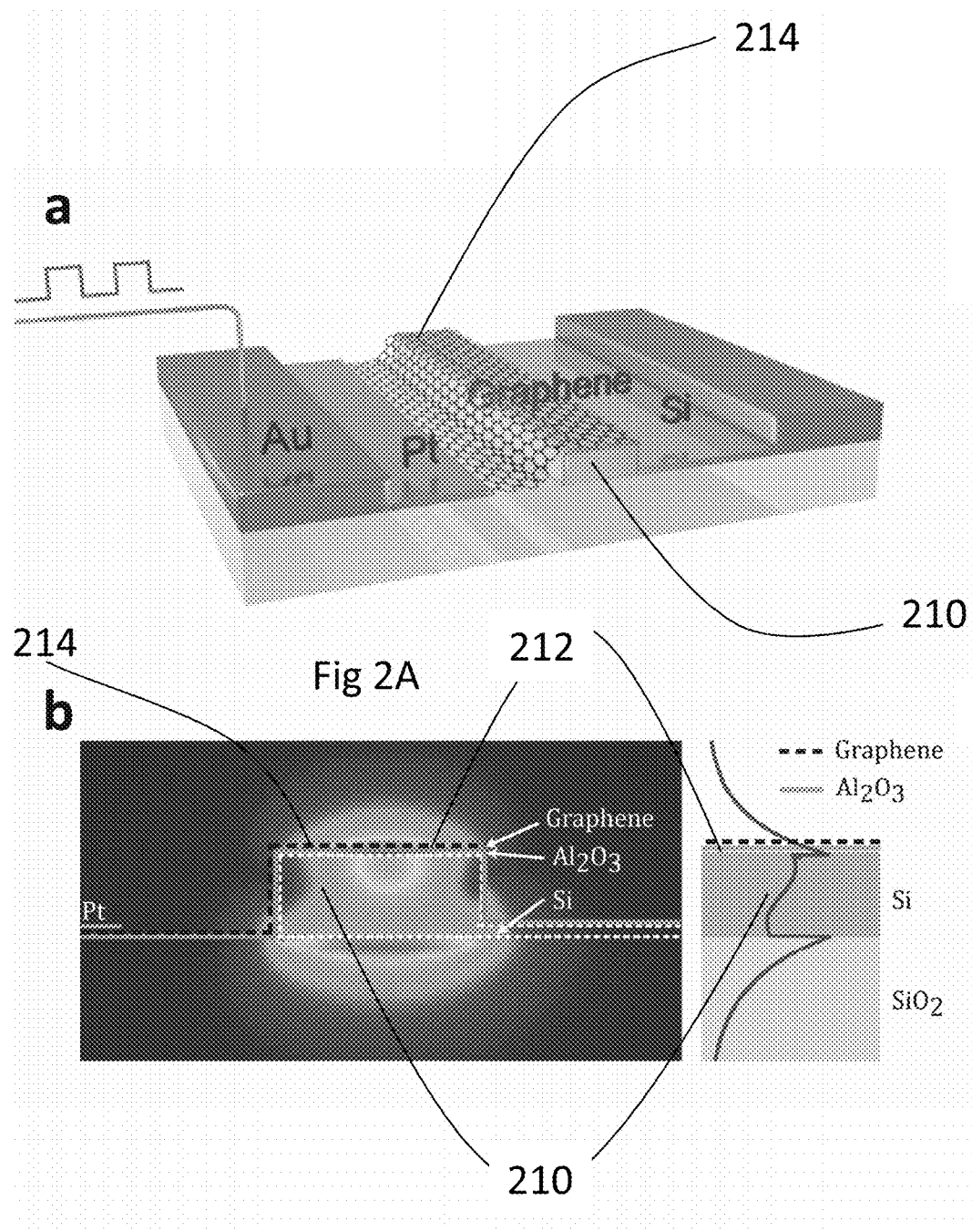

| | | |
|---|---|---|
| 2009/0235721 A1 | 9/2009 | Robinson et al. |
| 2010/0291828 A1* | 11/2010 | Reches et al. ................. 442/340 |
| 2011/0102068 A1* | 5/2011 | Bouchiat et al. .............. 327/527 |
| 2011/0104442 A1* | 5/2011 | Yoon et al. .................... 428/152 |
| 2011/0116168 A1 | 5/2011 | Nikoobakht |
| 2013/0101247 A1* | 4/2013 | Cho et al. .......................... 385/1 |

OTHER PUBLICATIONS

Liu, M.; Yin, X. B.; Ulin-Avila, E.; Geng, B. S.; Zentgraf, T.; Ju, L.; Wang, F.; Zhang, X. Nature 2011, 474 (7349), 64-67.

Reed, G. T.; Mashanovich, G.; Gardes, F. Y.; Thomson, D. J. Nat. Photonics 2010, 4 (8), 518-526.

International Search Report and Written Opinion for International Application No. PCT/US2012/034418 mailed Jul. 30, 2012.

* cited by examiner

Semiconductor Optical Modulator

FIG. 1
(Prior Art)

Top View

Side View

OPTICAL MODULATOR INCLUDING GRAPENE

RELATED APPLICATIONS

This application is a continuation-in-part of PCT Application No. PCT/US2012/034418, filed Apr. 20, 2012, which claims priority to U.S. Provisional Patent Application No. 61/478,467, filed Apr. 22, 2011 and to U.S. Provisional Patent Application 61/598,471, filed Feb. 14, 2012, all of which are herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

The present invention relates to the field of optical modulators, and particularly relates to graphene based optical modulators, including both a single layer and a multi-layer graphene based modulator.

BACKGROUND

Optical modulators with high modulation speed, small footprint, and large optical bandwidth are needed as the enabling device for on-chip optical interconnects.

Semiconductor optical modulators have witnessed rapidly-expanding research interests over the last few years. However, it has been found that the prior art semiconductor-based electro-optical modulators have disadvantages, including stringent fabrication tolerance, high cost, large device footprint, and high optical loss.

FIG. 1 depicts a prior art semiconductor optical modulator.

The device footprint of silicon-based modulators is on the order of millimeters, with these devices being limited by their weak electro-optical properties. Germanium and compound semiconductors, on the other hand, face the major challenge of integration with existing silicon electronics and photonics platforms. Integrating the silicon modulators with high quality-factor optical resonators efficiently increases the modulation strength. However, these devices suffer from intrinsic narrow-bandwidth, aside from their sophisticated optical design, stringent fabrication, and temperature tolerances. Notably, such semiconductor optical modulators are also polarization sensitive. Finding a complementary metal-oxide-semiconductor (CMOS) compatible material with adequate modulation speed and strength is becoming a task of not only scientific interest, but also industrial importance.

Graphene, a single layer of carbon atoms, has attracted growing attentions due to its outstanding and intriguing properties. Possessing the highest carrier mobility of more than 200,000 $cm^2/(V \cdot s)$, graphene has stirred up particular interest for high-speed electronics, and is considered as a promising replacement for silicon for on-chip integration.

Graphene also shows attractive optical properties over a broad spectral range from the visible to mid-infrared (IR). A graphene-based plasmonic device at the mid-infrared (IR) regime has been recently explored, and innovative transformation optics have also been proposed on a graphene platform. Graphene can absorb 2.3% of the normal incident ultraviolet and visible light, despite the fact that it has only one atomic layer. This universal absorption coefficient is due to the unique linear and gapless band dispersion of Dirac fermions. Although this absorption is small, novel passive optoelectronics including mode-lock laser, polarizers, and photodetectors have already been demonstrated by utilizing the anisotropic absorption property of graphene and the generated hot electrons.

Graphene can also be actively tuned in a dramatic way. With the free electrons tightly confined within the single atomic layer, graphene has a very low density of states, especially when electron energy is close to the Dirac point. Slight variations of carrier density can therefore cause significant shifts in Fermi energy (EF) (the highest energy level of electrons), which changes the rate of interband transitions and subsequently the optical constant.

Therefore, an optical high performance, low insertion loss, graphene modulator is needed.

SUMMARY

Embodiments of the present invention provide an integrated optical modulator with high modulation speed, small footprint, and large optical bandwidth. Embodiments of the present invention provide a broadband, high-speed, waveguide-integrated electro-absorption modulator based on monolayer graphene. By electrically tuning the Fermi level of the graphene sheet, embodiments of the present invention can achieve over 1 GHz modulation of the guided light with a broad operation spectrum ranging from 1.35-1.6 µm under ambient conditions. Embodiments of the present invention include an active device area of merely 25 $\mu m^2$.

Embodiments of the present invention provide an integration of graphene with an optical waveguide, which greatly increase the interaction length with light through the coupling between the evanescent waves and graphene. Embodiments of the present invention can open new routes to integrated photonics with a compact footprint, low voltage operation, and ultrafast modulation across a broad range of wavelengths.

By way of the graphene-based optical modulator of the present invention, having a broad optical bandwidth (1.35-1.6 µm), small device footprint (25 $\mu m^2$), and high operation speed (1.2 GHz at 3 dB) under ambient conditions, essential capabilities for optical interconnects for future integrated opto-electronic systems, are provided. The flexibility of graphene sheets could also enable radically different photonic devices. For example, it can be integrated with flexible substrate and plastic waveguides. Or it can be used in novel geometries such as core-shell modulator of nano-optical cable. The recent development of large scale graphene synthesis and transfer techniques ensures its comparability with the existing integrated electronics platform.

In one embodiment of the present invention a single layer graphene optical modulator is provided. In another embodiment of the present invention a multi-layer graphene optical modulator is provided. The modulator of this embodiment uses a similar structure as a forward/reverse-biased silicon modulator in which the doped silicon is replaced by intrinsic/predoped graphene, removing the insertion loss due to the doped silicon waveguide. Both electrons and holes are injected into graphene layers to form a p-oxide-n like junction, and the optical loss from silicon can be reduced to a minimum.

Embodiments of the present invention benefit from the unique linear band dispersion of graphene which gives a symmetrical density of states (DOS) near the Dirac point. Because the interband transition coefficient in graphene is only determined by |EF| but not its sign, in the case of multi-layers, both graphene layers can become transparent simultaneously at high drive voltage, and the present invention is thus at an "on" state.

Embodiments of the present invention avoid the participation of electrons/holes in silicon, and therefore its operation speed could be only limited by the carrier mobility in graphene. In addition, using two graphene layers for the active medium in embodiments of the present invention can further increase the optical absorption and modulation depth, giving advantages including smaller footprints and lower power consumptions.

BRIEF DESCRIPTION

FIG. 1 is a representation of a semiconductor optical modulator of the prior art.

Figure 2C:
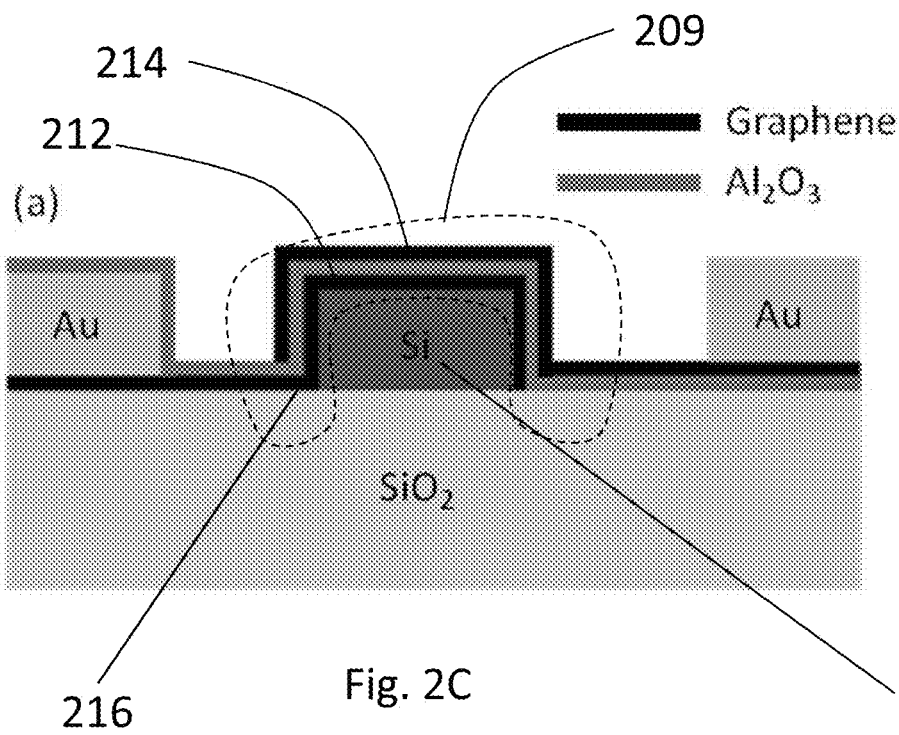
Figure 2D:
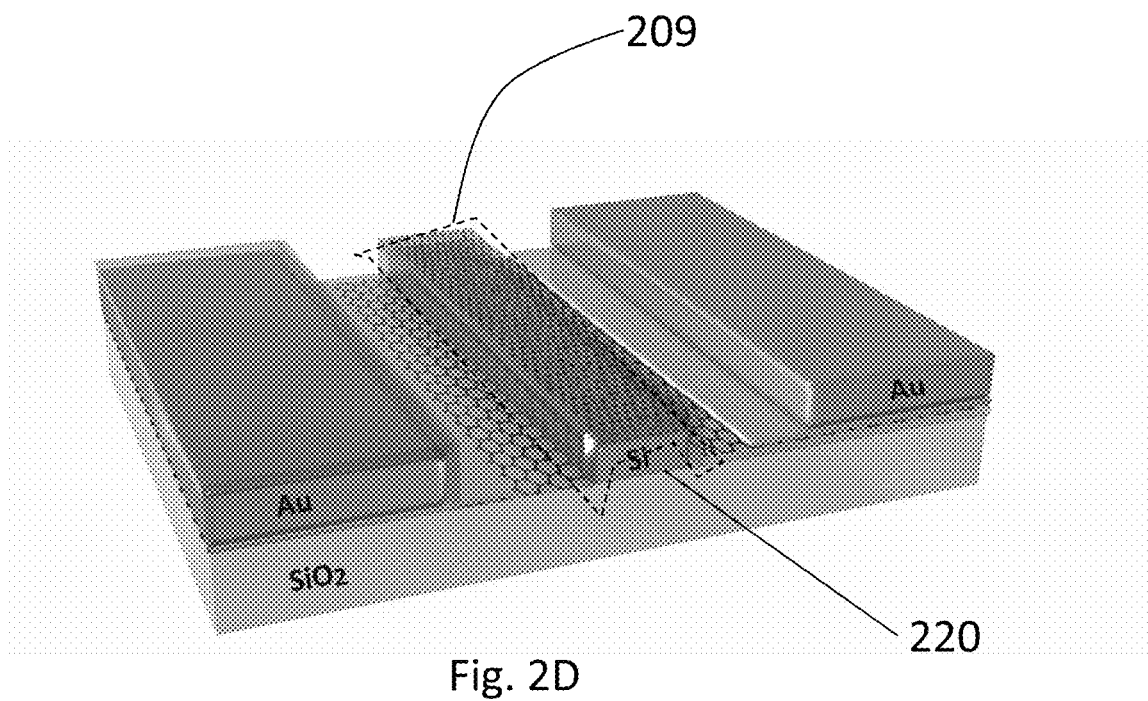
Figures 2E, 2F:
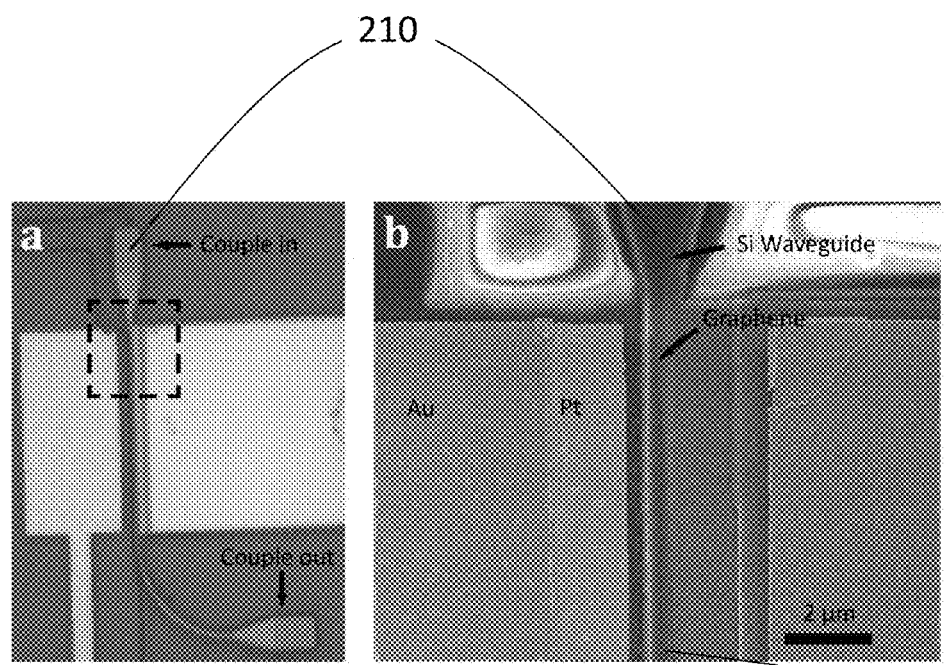

FIGS. 2A and 2B are schematic representations of a single layer graphene optical modulator according to an embodiment of the invention. FIGS. 2C and 2D are schematic representations of a multi-layer graphene optical modulator according to another embodiment of the invention. FIGS. 2E and 2F are top view optical microscope images of a fabricated monolayer graphene optical modulator of embodiments of the present invention.

Figure 3A:
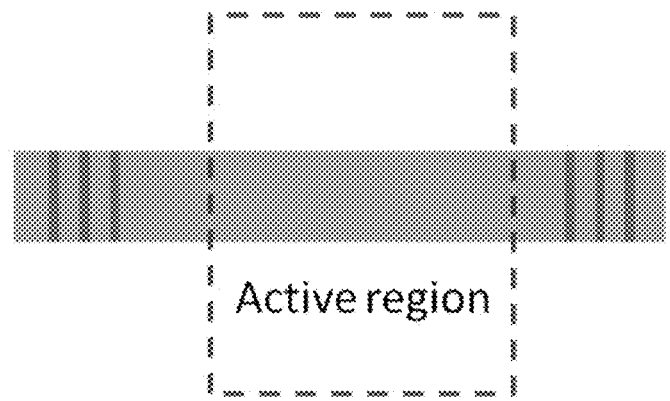
Figure 3B:
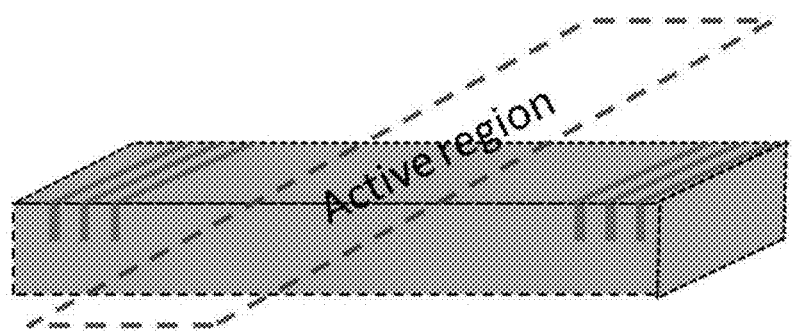

FIG. 3A is a top view and FIG. 3B is a side view of a typical graphene modulator, which includes an active graphene region (dashed-line region), waveguide and cavity (optional, formed by the stripes).

Figure 4A:
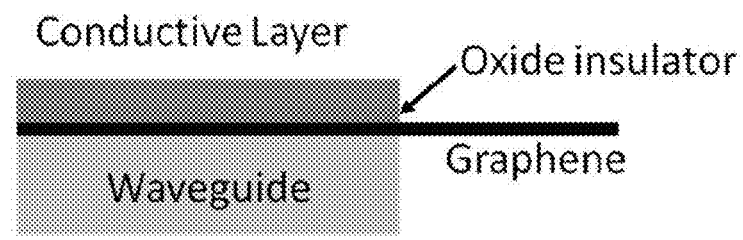
Figure 4B:
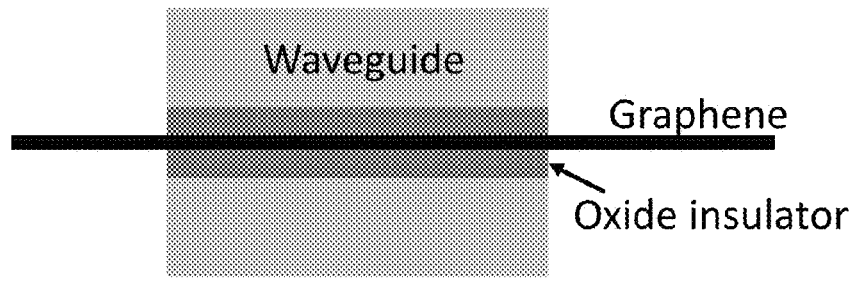
Figure 4C:
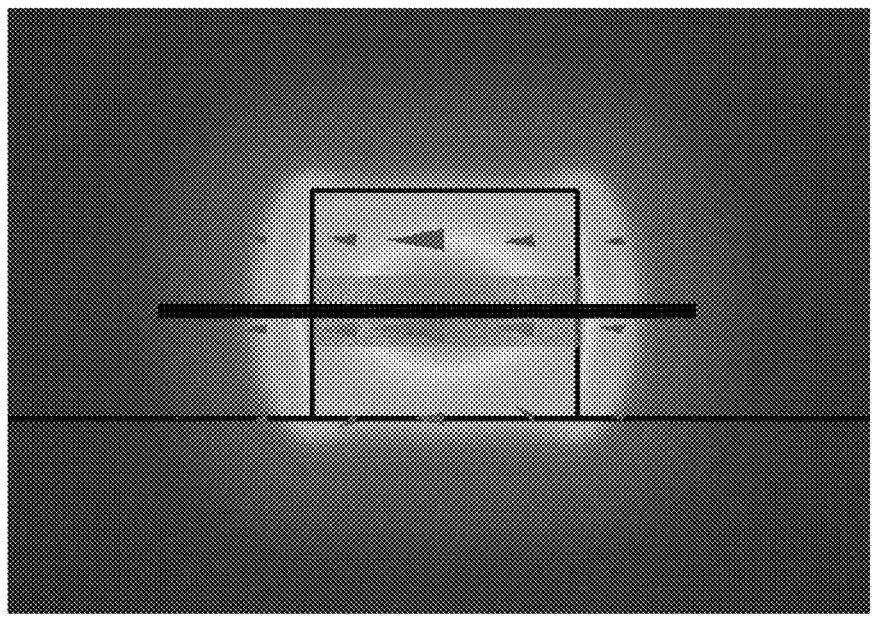

FIGS. 4A, 4B, and 4C are graphic illustrations of alternative constructions according to exemplary embodiments of the invention.

Figure 5:
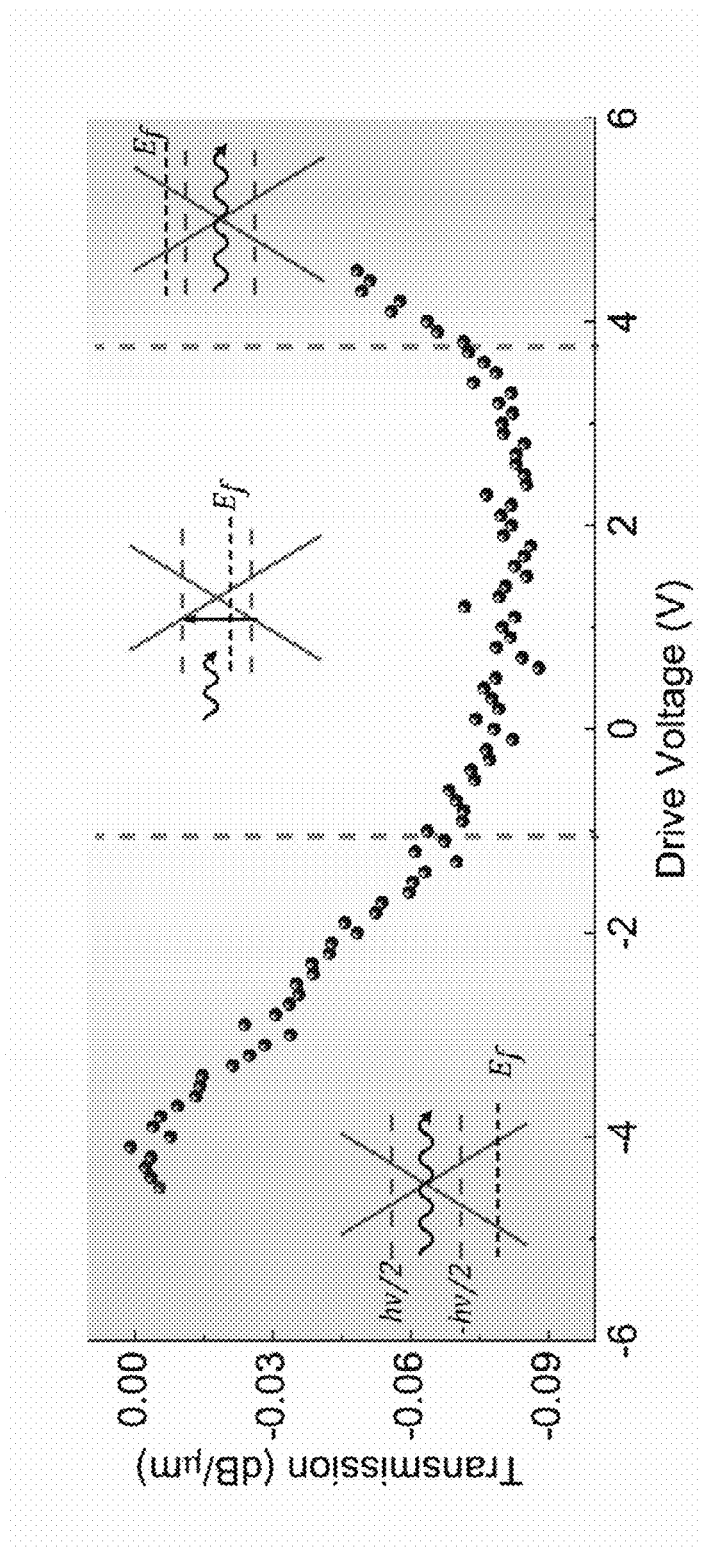

FIG. 5 is a plot of transmission v. drive voltage for a monolayer graphene optical modulator according to an embodiment of the invention.

Figure 6:
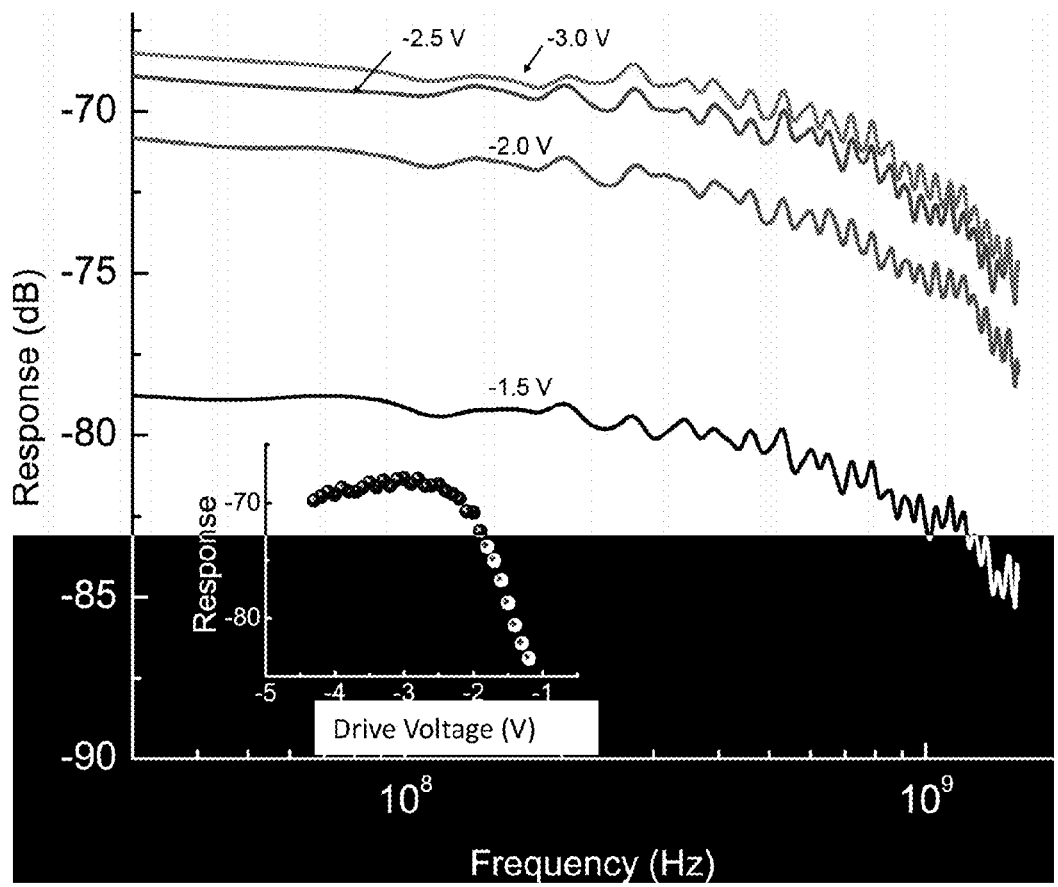

FIG. 6 includes plots of response vs. frequency and response vs. drive voltage for the monolayer graphene optical modulator according to an embodiment of the invention.

Figure 7A:
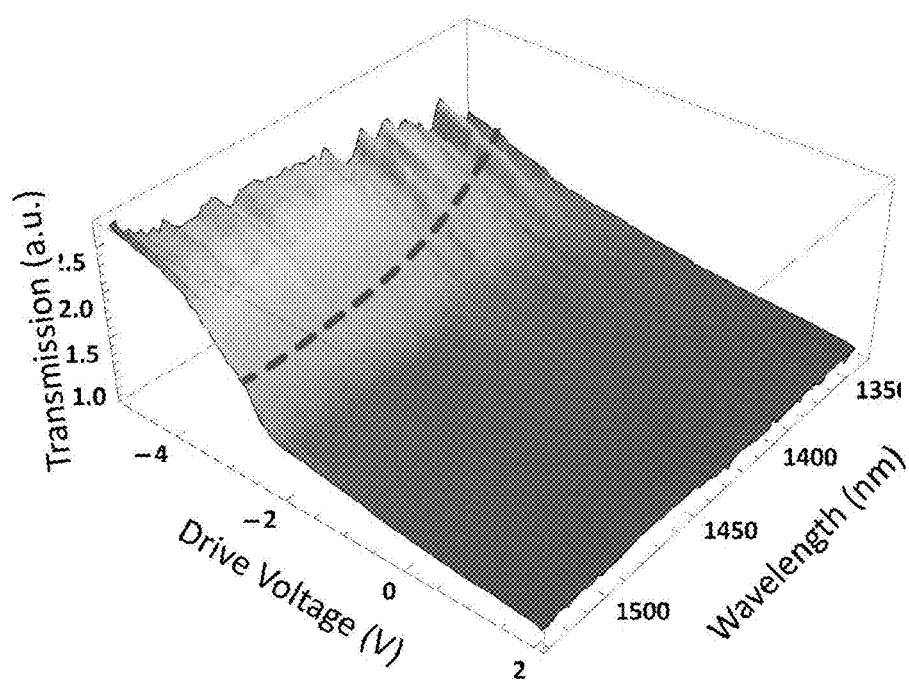
Figure 7B:
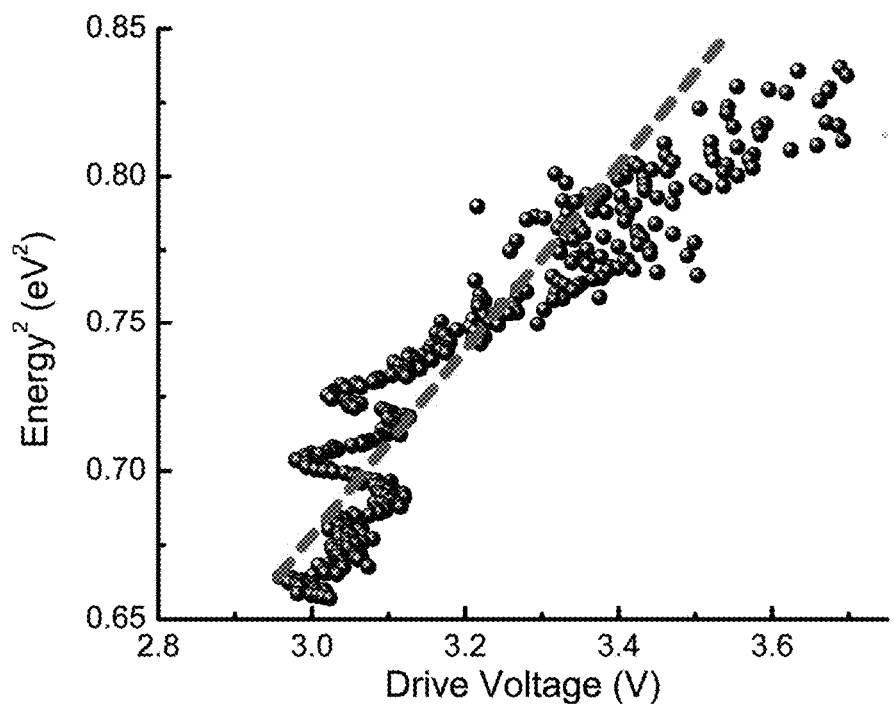
Figure 8A:
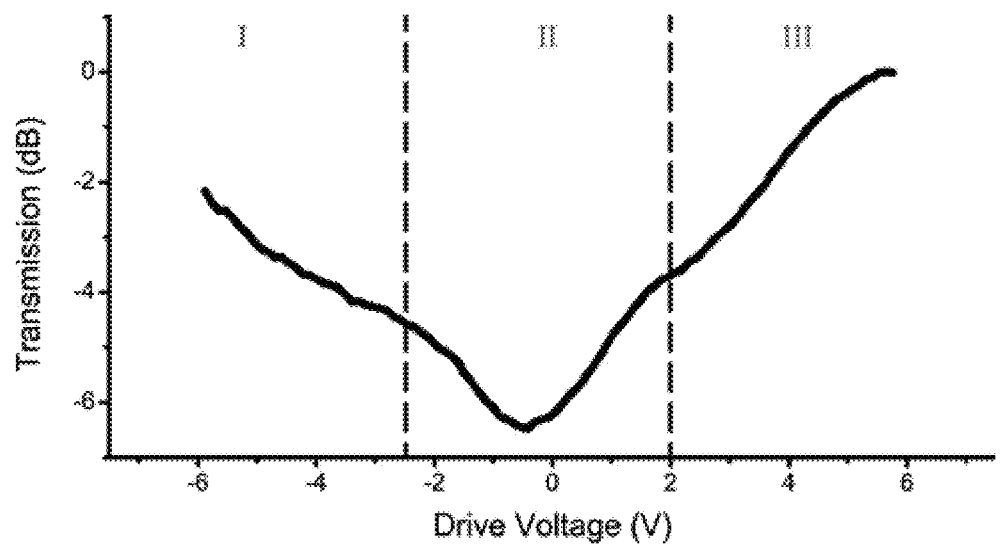
Figure 8B:
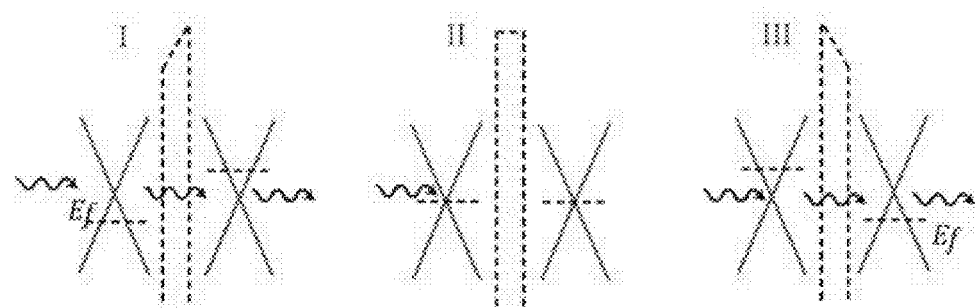

FIG. 7A is a plot of transmission as a function of both drive voltage and wavelength for a single layer graphene optical modulator according to an embodiment of the invention. FIG. 7B is a plot of photon energy vs. drive voltage for a single layer graphene optical modulator according to an embodiment of the invention FIG. 8A is a plot of transmission vs. drive voltage for a multi-layer graphene optical modulator according to an embodiment of the invention. FIG. 8B is the schematic of the working mechanism for a multi-layer graphene optical modulator according to an embodiment of the invention.

Figure 9:
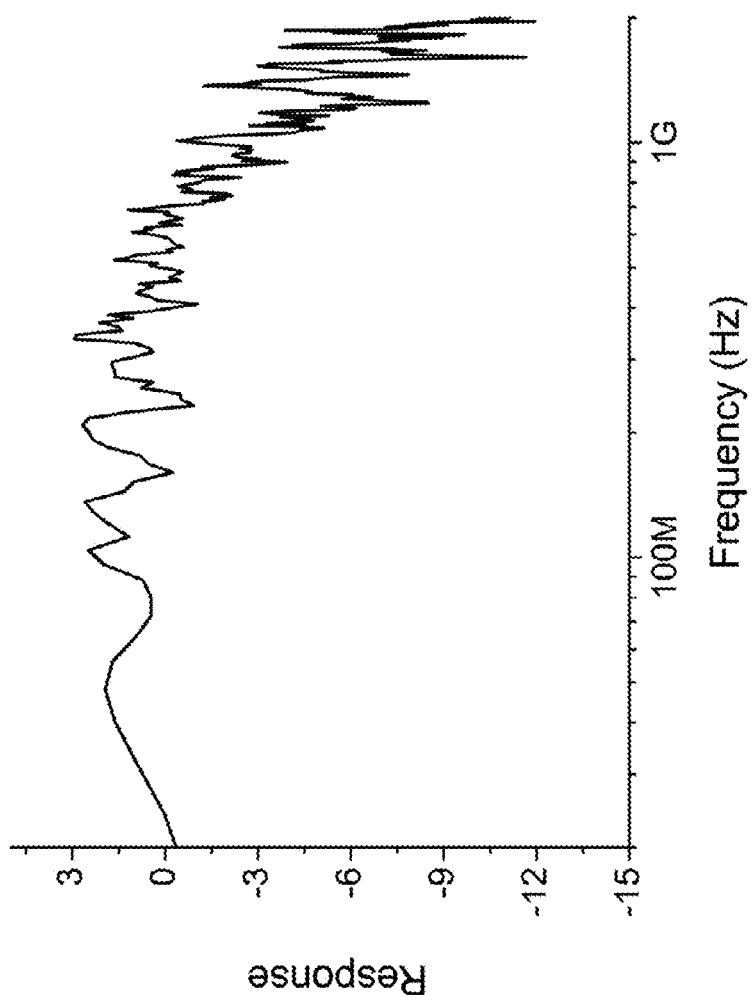

FIG. 9 is a plot of response vs. frequency for a multi-layer graphene optical modulator according to an embodiment of the invention.

DETAILED DESCRIPTION

The present invention provides an optical modulator. In one embodiment the modulator comprises a single sheet of monolayer graphene. In another embodiment, the modulator incorporates multi-layers (that is at least two separate monolayers) of graphene.

In the first exemplary embodiment of an optical modulator according to one aspect of the present invention, the modulator includes (1) an optical waveguide, (2) a nanoscale oxide spacer adjacent to a working region of the waveguide, and (3) a monolayer graphene sheet adjacent to the spacer.

In another embodiment of the present invention a multi-layer graphene optical modulator is provided. In an exemplary embodiment, the optical modulator includes (1) at least one pair of active media, where the pair includes (a) an oxide spacer, (b) a first monolayer graphene sheet adjacent to a first side of the spacer, (c) a second monolayer graphene sheet adjacent to a second side of the spacer, and (2) at least one optical waveguide adjacent to the pair.

Referring to FIG. 2A and FIG. 2B, in an exemplary embodiment, the present invention includes an optical waveguide 210, a nanoscale oxide spacer 212 adjacent to a working region of waveguide 210, and a monolayer graphene sheet 214 adjacent to spacer 212.

Referring to FIG. 2C and FIG. 2D, in an exemplary embodiment, the present invention includes at least one pair 209 of active media, where pair 209 includes an oxide spacer 212, a first monolayer graphene sheet 214 adjacent to a first side of spacer 212, a second monolayer graphene sheet 216 adjacent to a second side of spacer 212, and at least one optical waveguide 220 adjacent to pair 209.

In an exemplary embodiment, waveguides 210 and 220 include a dielectric. In a particular embodiment, the dielectric includes Si. In a particular embodiment, the dielectric includes $Si_3N_4$. In a particular embodiment, the dielectric includes $SiO_2$.

In an exemplary embodiment, waveguides 210 (FIG. 2A) and 220 (FIG. 2C) include a plasmonic waveguide, where the plasmonic waveguide includes a metallic structure that supports propagating surface plasmon waves. In an exemplary embodiment, waveguide 220 includes a nanoscale structure.

In an exemplary embodiment, the waveguides have a low quality factor. In a particular embodiment, the quality factor is within a range of 10 to 100. In a particular embodiment, the quality factor is within a range of 10 to 1000. In a particular embodiment, the quality factor is within a range of 10 to 10000. In a particular embodiment, the quality factor is within a range of 10 to 100000. In a particular embodiment, the quality factor is within a range of 10 to 1000000.

In an exemplary embodiment, the waveguides include a material that is doped. In an exemplary embodiment, the waveguides include a transparent material. In an exemplary embodiment, the transparent material includes a transparent polymer. In a particular embodiment, the transparent polymer includes SU-8 photoresist. In an exemplary embodiment, the transparent material includes water.

In an exemplary embodiment, spacer 212 includes a dielectric. In a particular embodiment, the dielectric includes $Al_2O_3$. In a particular embodiment, the dielectric includes $HfO_2$. In a particular embodiment, the dielectric includes $SiO_2$.

In the exemplary embodiment of FIGS. 2A and 2B, graphene sheet 214 has an optical absorption coefficient that is tuned with a drive voltage between graphene sheet 214 and an electrode. In an exemplary embodiment, the drive voltage is approximately 5 V. In an exemplary embodiment, the drive voltage is less than 5 V. In a particular embodiment, the drive voltage is approximately 2 V. In a particular embodiment, the drive voltage is approximately 1 V. In an exemplary embodiment, the electrode includes waveguide 210.

In the exemplary embodiment of FIGS. 2C and 2D, each of first graphene sheet 214 and second graphene sheet 216 have an optical absorption coefficient that is tuned with a drive voltage between the first graphene sheet and the second graphene sheet. In an exemplary embodiment, the drive voltage is approximately 5 V. In an exemplary embodiment, the drive voltage is less than 5 V. In a particular embodiment, the drive voltage is approximately 2 V. In a particular embodiment, the drive voltage is approximately 1 V.

In both exemplary embodiments, the waveguide can include a low Q optical cavity. In an exemplary embodiment, the cavity includes two sets of gratings. In a particular embodiment, the two sets of gratings are outside of the working, or active, region, as shown in FIG. 3A and FIG. 3B. In a particular embodiment, one of the two sets of gratings is outside of the working, or active, region and the other of the two sets of gratings is inside the working region. In a particular embodiment, the two sets of gratings are inside the working, or active, region.

Referring to FIG. 4A, in an exemplary embodiment, the optical modulator includes (1) an optical waveguide, (2) a monolayer graphene sheet adjacent to a working region of the waveguide, (3) a nanoscale oxide spacer adjacent to the graphene sheet, and (4) a conductive layer adjacent to the spacer. Referring to FIG. 4B, in an exemplary embodiment, the optical modulator includes (1) a first optical waveguide, (2) a first nanoscale oxide spacer adjacent to a working region of the first waveguide, (3) a monolayer graphene sheet adjacent to the first spacer, (4) a second optical waveguide, and (5) a second nanoscale oxide spacer adjacent to a working region of the second waveguide and adjacent to the graphene sheet. FIG. 4C shows a cross section of an embodiment of the present invention, with an overlay of the optical mode plot, carried out by finite element simulation.

Embodiments of the present invention could easily be expanded to include multi-pairs of double graphene layers, which could lead to even further device improvements such as smaller device footprint and lower energy consumption.

EXAMPLES

Embodiments of the present invention will be described in greater detail by way of specific examples. The following examples are offered for illustrative purposes, and are intended neither to limit nor define the invention in any manner.

Example 1

Single Layer Graphene Optical Modulator

The present invention provides a waveguide-integrated graphene-based modulator that includes actively tuning the Fermi level of a monolayer graphene sheet. The gigahertz graphene modulator demonstrates a strong electro-absorption (EA) modulation of 0.1 dB/μm and operates over a broad range of wavelength from 1.35 μm to 1.6 μm under ambient conditions.

The structure of the EA modulator is schematically illustrated in FIG. 2A and FIG. 2B. A 50-nm-thick Si layer was used to connect the 250-nm-thick Si bus waveguide 210 and one of the gold electrodes. Both the silicon layer and waveguide 210 were doped with boron to reduce the sheet resistance (boron doped spin-on-glass, 850° C., 180 sec.). Seven-nm-thick $Al_2O_3$ was then uniformly deposited on the surface of waveguide 210 by atomic layer deposition (ALD) as spacer 212. A graphene sheet 214 grown by chemical vapor deposition (CVD) was then mechanically transferred onto the Si waveguide 210. In order to further reduce the access resistance of the device, the counter electrode was extended towards the bus waveguide by depositing a platinum (10 nm) film on top of the graphene layer 214. The minimum distance between the platinum electrode and waveguide 210 was controlled at 500 nm, so that the optical modes of waveguide 210 remained undisturbed by the platinum contact. The excess graphene was removed by oxygen plasma, leaving only the regions on top of waveguide 210 and between the waveguide 210 and the platinum electrode.

FIG. 2A shows a three dimensional schematic illustration of an embodiment of the present invention, with a monolayer graphene sheet 214 on the top of a bus silicon waveguide 210 and 7-nm-thick $Al_2O_3$ in between as a spacer 212. The silicon 210 is doped and bridged to the electrode through a thin layer of silicon defined by selective etching. FIG. 2B shows a cross section of the device, with an overlay of the optical mode plot, carried out by finite element simulation. The waveguide was single mode operated and was designed to have the field maximized at the interface between waveguide 210 and the graphene 214 to maximize the absorption efficiency. The thin silicon layer and the Pt electrode, which is 500 nm away from waveguide 210, have negligible influence on the optical mode. The curve in FIG. 2B shows the magnitude of the electric field at the cross section through the center of waveguide 210. In this example, the actual thicknesses of graphene sheet 214 and $Al_2O_3$ 212 in the simulation are 0.7 nm and 7 nm, respectively.

The cross-section view of an embodiment of the present invention and the optical field distribution of the guided mode are shown in FIG. 2B. The thin silicon layer and the platinum electrode adjacent to waveguide 210 have negligible effect on the mode profile. In order to further improve the EA modulation efficiency, waveguide 210 was designed to have the electric field maximized at the top and bottom surface of the Si waveguide 210 so that the interband transitions in graphene 214 are also maximized, as shown in FIG. 2B. As graphene only interacts with the tangential (in-plane) electric field of photons, the graphene modulator of the embodiment of the present invention is polarization sensitive, in common with conventional semiconductor-based electro-optical modulators.

FIG. 2E and FIG. 2F show a top view optical microscope image of an embodiment of the present invention and a close-up scanning electron microscopy image of the active region. The graphene sheet 214, as highlighted in FIG. 2F, covers only the waveguide region to minimize the capacitance. The platinum electrode is 500 nm to the left of the 600-nm-wide Si waveguide 210. Light was coupled in and out of waveguide 210 through tapered gratings, which contribute most to the overall loss of the system. The Si waveguide 210 was bent 90 degrees to change the polarization state between the input and the output light to improve the signal-noise ratio of the embodiment of the present invention.

FIG. 2E shows a top-view microscope image of the waveguide. The Si waveguide was bent 90 degrees to change the polarization state between the input and the output light to improve the signal-noise ratio. FIG. 2F, showing the magnified SEM image of the dashed region in optical image of FIG. 2E, shows detailed structure of the graphene modulator. The width of the Si waveguide is 600 nm, while the distance between the Pt electrode and the Si waveguide is 500 nm. The bright multi-ring region beside the Au electrodes is due to charging effect on the $SiO_2$ layer in the SEM.

FIG. 5 displays the transmission of 1.53 μm photons through waveguide 210 at different drive voltages. At a low drive voltage (−1 V<$V_D$<3.8 V), the Fermi level $E_f(V_D)$ of graphene is close to the Dirac point ($|E_f(V_D)|<hv_0/2$), and interband transitions occur when electrons are excited by the incoming photons ($hv_0$). The optical absorption of graphene is determined by the position of the Fermi level. By adding a bias between graphene sheet 214 and waveguide 210, the Fermi level of graphene sheet 214 can be tuned, and therefore graphene sheet 214 can modulate the total transmission. The present invention allows for a modulation depth as high as 0.1 dB/μm, resulting in a graphene EA modulator with a footprint of only 25 μm.

Also shown in FIG. 5, at large negative $V_D$ (<−1 V), the Fermi level is lowered below the transition threshold ($|E_f(V_D)|=hv_0/2$) due to positive charge accumulation. As a result, there would be no electron available for interband transition, and hence graphene sheet 214 appears transparent.

Shown as well in FIG. 5, at large positive $V_D$ (>3.8 V), all electron states are filled up, and no interband transition is allowed. Ideally, there should be a sharp change in transmission at $|E_f(V_D)|=hv_0/2$. In reality, this transition was broadened owing to the defects in graphene, and shifted to higher V due to natural doping from the substrate. When the present invention is in operation (i.e., no interband absorption is allowed), the insertion loss is negligible as the intraband absorption of graphene is extremely low at near-infrared wavelengths.

FIG. 5 shows the DC measurement an embodiment of the present invention. The main panel shows the modulation depth, normalized to the device length (40 μm), under different drive voltages ($V_D$). Three regions can be found in the figure. In the middle region with $V_D$ from −1 V to 3.8 V, the Fermi level is close to the Dirac point and the interband transition is allowed. Thus the graphene sheet is absorptive, resulting in a modulation depth of 0.1 dB/μm and a miniaturized footprint of the modulator. When $V_D$<−1 V, the Fermi level is lowered and there are no electrons available for interband transition. While when $V_D$>3.8 V, all electron states in resonant with hv are occupied, and the transition is forbidden. In both of the later two cases, the transmission increases. The natural doping from the substrate offset the center of the absorption curve from zero bias. The laser wavelength is 1.53 μm for the device.

As shown in FIG. 6, in order to measure the dynamic response of the graphene modulator, radio frequency (RF) signals generated by a network analyzer were added on a static $V_D$ and applied to an embodiment of the preset invention. The same 1.53 μm laser was used to test the present invention, and the out-coupled light was sent to a high-speed photo-detector. Shown in FIG. 6 are the $V_D$ dependent RF responses of the present invention, showing gigahertz operation of the device at various drive voltages. Owing to the exceptionally high carrier mobility and saturation velocity of graphene, the bandwidth is not limited by the carrier transit time, but by the parasitic response of the device. With the platinum electrode placed 500 nm away from the waveguide, the total resistance of the system is reduced to around 600Ω. This resistance, together with the capacitance on the order of 0.22 pF, limits the operation bandwidth of the present invention to giga-hertz.

The 3 dB modulation bandwidth is independent of the $V_D$ while the modulation efficiency is not. The device response at low frequency (300 kHz) is shown in the inset of FIG. 6. At low $V_D$, the modulation response is weak as the optical transmission is insensitive to $V_D$. When the drive voltage is increased, the RF response increases to a maximum at $V_D$=−4 V. As the drive voltage increases further, the modulation efficiency saturates as graphene is transparent within the modulation range of the bias voltage.

FIG. 6 shows the electro-optics response of the monolayer graphene optical modulator of an embodiment of the present invention. The measured 3 dB bandwidth of the device is found at 0.8 GHz, 1.1 GHz, 1.1 GHz and 1.2 GHz, for the drive voltages of −2.0 V, −2.5 V, −3.0 V and −3.5 V, respectively. The bandwidths are mainly restricted by the parasitic response of the device. The inset shows the response at static, indicating that the device has the best performance at drive voltage of −4V. The laser wavelength is 1.53 μm in the test.

As the overall optical opacity of graphene is independent of wavelength and the high frequency dynamic conductivity for Dirac fermions is a constant, the single graphene layer modulator of an embodiment of the present invention is therefore intrinsically broadband, unlike modulators based on optical cavities or resonant optical effects such as the quantum-confined Stark effect (QCSE). In order to access this broadband effect, the static response of the device with a white light source from a super-continuous laser was observed, as shown in FIGS. 7A and 7B. The $V_D$-dependent 2D spectra of the device are shown in FIG. 7A. A 3 dB modulation, corresponding to transmission value 2 (a.u.) in FIG. 7A, is achieved for a broadband wavelength from 1.35 μm to 1.6 μm with a $V_D$ of −4.5 V. Although a higher modulation depth and broader wavelength range are expected at a higher drive voltage, a low drive voltage was used not only to avoid spacer oxide breakdown but also because high drive voltages increases power assumptions and violates voltage restrictions in CMOS devices.

The graph FIG. 7A shows the 2D transmission spectra of the single graphene layer modulator of an embodiment of the present invention. FIG. 7B shows the electronic band dispersion of the CVD grown graphene. As graphene EA modulation is dictated by the optical transition, $hv=2|E_f|$, the single graphene layer modulator of the embodiment of the present invention has different responses at different wavelengths. Higher photon energy always requires larger change in the Fermi level. The trace for maximum transmission change rate, shown as eye-guide dashed line in FIG. 7A, is defined by $hv=2E_f=2\hbar v_F\sqrt{\alpha\pi|V+V_0|}$, where $v_F$ is the Fermi velocity, V and $V_0$ are the drive voltage and the voltage offset caused by natural doping, respectively, and $\alpha=9\times10^{16}$ m$^{-2}$V$^{-1}$, as estimated to a capacitor model of our device. The $V_D$-dependent transition frequency is plotted in the graph of FIG. 7B, where $hv=0.56$ eV$\sqrt{(V+V_0)}$. The linear fit determines the voltage offset of −0.8 V and the Fermi velocity of $0.9\times10^6$ m/s, which agrees with other reported values.

FIG. 7A and FIG. 7B show the spectrum characterization of the single graphene layer modulator of an embodiment of the invention. FIG. 7A shows the transmission of the device with different drive voltage, ranging from 1350 nm to 1600 nm. The transmission is normalized to $V_D$=1 V. The dashed curve shows the eye-guide of transmission equal to 1.5 (a.u.), which unambiguously bends to higher drive voltage at shorter wavelengths. FIG. 7B shows the trace of the modulation voltage plotted as squared photon energy versus drive voltage. The dashed line shows the linear fitting to the experimental data, which directly yields the Fermi velocity of $v_f=0.9\times10^6$ m/s.

Example 2

Multi-layer Graphene Optical Modulator

This example provides a multi-layer graphene optical modulator at high modulation depth (~0.16 dB/μm). By using two graphene layers 214 and 216 to form a p-oxide-n like junction, embodiments of the present invention avoid the insertion loss from doped silicon and can potentially work at high frequency.

The structure of an embodiment of the present invention is schematically illustrated in FIG. 2C and FIG. 2D. In an exemplary embodiment, the fabrication of the embodiment of the present invention starts with commercial silicon-on-insulator (SOI) wafers, with a device layer thickness of 340 nm, and a buried-oxide thickness of 2 μm. A 400 nm-wide silicon waveguide 220 with both ends connected to a pair of grating couplers (period=780 nm, optimized for λ=1537 nm) was fabricated using deep reactive-ion etch (DRIE). Atomic layer deposition (ALD) technique was then employed to conformally coat a 5 nm thick $Al_2O_3$ isolation layer to prevent potential carrier injections from the bottom graphene layer into the silicon.

A chip-sized graphene sheet, prepared on a Cu film by a chemical vapor deposition (CVD) method, was first protected by 200 nm-thick poly(methyl methacrylate) (PMMA) film which was baked at 110° C. for 10 min. After the Cu film was removed by a $FeCl_3$ solution (45%), the graphene sheet 216 was then rinsed and transferred on the waveguide for overnight baking.

E-beam lithography was then used to define the active region of graphene sheet 216, and oxygen plasma was applied to remove undesired graphene on one side of waveguide 220, leaving the other side for metallization (Pd/Au, 10/100 nm).

Direct deposition of high dielectric constant material through ALD growth on pristine graphene is challenging, owing to the hydrophobic nature of graphene basal plane. For the embodiment of the present invention, 1 nm of aluminum, which was immediately oxidized into $Al_2O_3$ upon exposure to the air, was deposited onto the bottom graphene layer 216 for the following ALD deposition. Using the oxidized aluminum as a seed, 12 nm of $Al_2O_3$ was then conformally deposited at 200° C. as spacer 212.

The top graphene layer 214 was then mechanically transferred onto the dies forming the desired capacitor structures. Subsequently, similar patterning and etching procedures as the bottom graphene layer 216 were performed on the top graphene layer 214 to define the active tuning areas of graphene and top metal electrodes.

In an exemplary embodiment, the fabrication of the present invention starts from the silicon waveguide 220 prepared from a silicon on insulator (SOI) wafer. A CVD prepared graphene sheet 216 was then mechanically transferred onto waveguide 220. E-beam lithography (EBL) and oxygen plasma was then used to remove unwanted regions, and thereafter to deposit an electrode. A thin layer of Al was then deposited by thermal evaporation, and thereafter spacer 212 of $Al_2O_3$ was deposited by ALD. Finally, second graphene sheet 214 was mechanically transferred. EBL and oxygen plasma were used to define the active region. Metal was then deposited for an electrode.

The static optical transmission of this second embodiment of the present invention was measured at the wavelength of 1537 nm, under different drive voltages. The peak transmission of the present invention was found to be $3 \times 10^{-3}$ (or −25 dB), with most of the insertion loss comes from the grating couplers (~14.6 dB for two couplers). As shown in FIG. 8A, a 6.5 dB modulation depth was achieved on a 40 μm-long device with HE mode excited, leaving ~4 dB insertion loss from graphene. Since the optical loss induced by intraband electron transition is of orders smaller than interband transition, this insertion loss is due to the impurities or nonuniform charge distributions on graphene.

The switching voltage, about 6 V for this embodiment, was only determined by the dielectric constant and thickness of the gate oxide, and the leak current was at the order of nA. This modulation depth, as expected, is almost two times of the single layer graphene modulator.

Another prominent feature is that the modulation curve is more symmetrical, arising from the structural symmetry of the top and bottom graphene layers 214 and 216. Three regions can be clearly differentiated from the curve, and each of them corresponds to a band structure model given in FIG. 8B. When the drive voltage is close to zero, both graphene layers 214 and 216 are undoped, or only slightly doped due to the environment. Therefore Fermi levels are close to the Dirac point, and both graphene sheets 214 and 216 are absorptive to light (evanescent wave in this case).

When the voltage is added between graphene sheets 214 and 216, the two graphene layers 214 and 216 form a simple parallel capacitor model, with one graphene layer doped by holes and the other by electrons at the same doping level. Linear energy dispersion in graphene band structure gives a Fermi level shift of $\Delta E_F = \hbar v_F \sqrt{\pi |n|}$, where $\hbar$ is the Plank constant divided by $2\pi$, $v_F$ is the Fermi velocity, and n is the electron/hold doping concentration. When the Fermi level shift in both graphene layers 214 and 216 reach half photon energy of incident light, both graphene layers become transparent simultaneously.

Changing the sign of the drive voltage only switches the roles of graphene layers 214 and 216 as anode and cathode, and gives similar response to the incident light. The lowest transmission point was shifted from zero, due to the predoping ($2 \times 10^{12}$ $cm^{-2}$ in total) on graphene layers. The asymmetry of the transmission curve was owing to the different environments for the top and bottom graphene layers 214 and 216, as the top one has only one side contact with $Al_2O_3$ while the bottom layer was sandwiched between two $Al_2O_3$ layers.

FIGS. 8A and 8B show the static response of the double layer graphene modulator. As shown in FIG. 8A, a ~6.5 dB modulation depth can be achieved on a 40 μm-long device, at the wavelength 1.537 μm. FIG. 8B shows the graphene band profiles for regions I, II, and III in FIG. 8A. The arrows in FIG. 8B represent the incident photons.

To measure the dynamic response of the double layer graphene modulator, an electrical signal generated by a network analyzer was superimposed onto a static drive voltage for small signal measurement. FIG. 9 shows the dynamic response of the double layer graphene modulator in the frequency range from 20 M to 2 GHz. A 3 dB cut-off of the present is at about 1 GHz, with static drive voltage of 2 V.

Further analysis shows that the capacitance of the double layer graphene modulator was about 0.1 pF, which agrees well with a simple parallel-capacitance model. Since the drive voltage is ~5V and the leak current is negligible, the power consumption is at the level of 1 pJ/bit. Analysis also reveals that the high series resistance (~1 kΩ) is the major reason for the low operation speed. Since the low graphene sheet resistant (~200 Ω/$cm^2$, when far away from Dirac point) contributes only ~10Ω to the total resistance if we consider the graphene as a 40 μm-long, 2 μm-wide stripe, the high series resistance is mainly contributed from the contact resistance between the graphene layer and the palladium electrode.

Improvements in the metal-graphene contact, such as plasma treatment, will probably not influence the insertion loss of the device, since the electrodes are 600 nm away from the active region and do not affect the optical mode. By reducing the series resistance to the level of 10~100Ω, a much higher 3 dB bandwidth could be expected.

FIG. 9 shows the dynamic response of the double layer graphene modulator. Notably, a 3 dB bandwidth is found to be ~1 GHz.

To optimize the modulation depth of the device, different waveguide widths were numerically analyzed by using finite element analysis. The active region is assumed to include both the top and sidewalls of the waveguide 220. In practice, the mechanically transferred graphene may not closely contact all sidewalls. However, this should not change significantly the overall absorption as the evanescent field of the waveguide mode spreads about a hundred nanometers away from the waveguide sidewalls.

The refractive index of undoped graphene is derived from the optical conductivity of graphene. With a wide waveguide 220, the HE mode gives better modulation ability (shorter decay length) than the EH mode. This is due to the fact that the overall tangential electrical field integrated on the top surface in the HE mode is greater than that in the EH mode. It also indicates that a narrower waveguide 220, which has a higher surface-volume ratio, could give better performance.

CONCLUSION

It is to be understood that the above description and examples are intended to be illustrative and not restrictive. Many embodiments will be apparent to those of skill in the art upon reading the above description and examples. The scope of the invention should, therefore, be determined not with reference to the above description and examples, but should instead be determined with reference to the appended claims, along with the full scope of equivalents to which such claims are entitled. The disclosures of all articles and references, including patent applications and publications, are incorporated herein by reference for all purposes.

We claim:

1. An optical modulator comprising:
an optical waveguide;
an oxide layer disposed on the optical waveguide;
a graphene sheet disposed on the oxide layer, the graphene sheet being selected from a group consisting of a single layer of carbon atoms and multiple layers of carbon atoms; and
an electrode in contact with the graphene sheet.

2. The optical modulator of claim 1, wherein the optical waveguide comprises a dielectric material.

3. The optical modulator of claim 1, wherein the optical waveguide comprises a material selected from a group consisting of silicon, silicon nitride, and silicon dioxide.

4. The optical modulator of claim 1, wherein the optical waveguide comprises a plasmonic waveguide having a metallic structure configured to support propagating surface plasmon waves.

5. The optical modulator of claim 1, wherein the optical waveguide has a quality factor within a range selected from a group consisting of 10 to 100, 10 to 1000, 10 to 10000, 10 to 100000, and 10 to 1000000.

6. The optical modulator of claim 1, wherein the oxide layer comprises a material selected from a group consisting of aluminum oxide, hafnium oxide, and silicon dioxide.

7. The optical modulator of claim 1, wherein the optical waveguide comprises a low Q optical cavity.

8. The optical modulator of claim 1, wherein the optical waveguide comprises a material that is doped.

9. The optical modulator of claim 1, wherein the optical waveguide comprises a transparent material.

10. The optical modulator of claim 9, wherein the transparent material comprises a transparent polymer.

11. The optical modulator of claim 9, wherein the transparent material comprises SU-8 photoresist.

12. The optical modulator of claim 1, wherein the optical waveguide comprises a nanoscale structure.

13. An optical modulator comprising:
an optical waveguide;
a first graphene sheet disposed on the optical waveguide;
a first electrode in contact with the first graphene sheet;
an oxide layer disposed on the first graphene sheet;
a second graphene sheet disposed on the oxide layer; and
a second electrode in contact with the second graphene sheet.

14. The optical modulator of claim 13, wherein the optical waveguide comprises a material selected from a group consisting of silicon, silicon nitride, and silicon dioxide.

15. The optical modulator of claim 13, wherein the oxide layer comprises a material selected from a group consisting of aluminum oxide, hafnium oxide, and silicon dioxide.

16. The optical modulator of claim 13, wherein the optical waveguide comprises a transparent material.

17. The optical modulator of claim 16, wherein the transparent material comprises SU-8 photoresist.

18. The optical modulator of claim 13, wherein the optical waveguide comprises a material that is doped.

19. The optical modulator of claim 13, wherein the first graphene sheet and the second graphene sheet each comprise a a single layer of carbon atoms.

20. The optical modulator of claim 13, wherein the first graphene sheet and the second graphene sheet each comprise multiple layers of carbon atoms.

* * * * *